United States Patent
Miele et al.

(10) Patent No.: US 10,990,129 B2
(45) Date of Patent: Apr. 27, 2021

(54) CONVERTIBLE DUAL SCREEN LAPTOP

(71) Applicant: Intel Corporation, Santa Clara, CA (US)

(72) Inventors: Ralph V. Miele, Hillsboro, OR (US); Drew G. Damm, Hillsboro, OR (US); Dan H. Gerbus, Hillsboro, OR (US); Andrew Larson, Hillsboro, OR (US); Shyamjith Mohan, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/313,550

(22) PCT Filed: Jul. 1, 2016

(86) PCT No.: PCT/US2016/040792
§ 371 (c)(1),
(2) Date: Dec. 27, 2018

(87) PCT Pub. No.: WO2018/004675
PCT Pub. Date: Jan. 4, 2018

(65) Prior Publication Data
US 2019/0227598 A1      Jul. 25, 2019

(51) Int. Cl.
*G06F 1/16* (2006.01)
(52) U.S. Cl.
CPC .......... *G06F 1/1649* (2013.01); *G06F 1/1616* (2013.01); *G06F 1/1647* (2013.01); *G06F 1/1679* (2013.01); *G06F 1/1681* (2013.01)
(58) Field of Classification Search
CPC ...................................... H05K 5/00
See application file for complete search history.

(56) References Cited

U.S. PATENT DOCUMENTS

| | | | |
|---|---|---|---|
| 2005/0134524 A1* | 6/2005 | Parker | G06F 3/1431 345/1.1 |
| 2010/0123646 A1 | 5/2010 | Richardson | |
| 2012/0039028 A1* | 2/2012 | Choo | H04M 1/0237 361/679.01 |
| 2013/0334376 A1 | 12/2013 | Moscovitch | |

(Continued)

FOREIGN PATENT DOCUMENTS

| | | |
|---|---|---|
| JP | 2004518182 A | 6/2004 |
| KR | 10-1475490 B1 | 12/2014 |
| WO | 0177786 A2 | 10/2001 |

OTHER PUBLICATIONS

International Search Report and Written Opinion for International Patent Application No. PCT/US2016/040792, dated Mar. 31, 2017, 17 pages.

(Continued)

*Primary Examiner* — Jerry Wu
(74) *Attorney, Agent, or Firm* — Jordan IP Law, LLC

(57) ABSTRACT

A dual screen display device may include a set of displays including a first display and a second display. A base may support the displays. A hinge may be coupled between the first and second displays. A channel and post may be provided in the displays and the base to provide a sliding translation between the base and the displays. In some embodiments of the dual screen device, the hinge, channel and post cooperate to provide a coupled translation of the first and second displays relative to the base.

8 Claims, 13 Drawing Sheets

(56) References Cited

U.S. PATENT DOCUMENTS

2014/0118262 A1 5/2014 Lin
2014/0375194 A1* 12/2014 Arima ................ G06F 1/1616
　　　　　　　　　　　　　　　　　　　　　　312/322
2015/0212546 A1 7/2015 Ram

OTHER PUBLICATIONS

International Preliminary Report on Patentability for International Patent Application No. PCT/US2016/040792, dated Jan. 10, 2019, 11 pages.
Japanese Office Action for Japanese Patent Application No. 2018-561948, dated Mar. 10, 2020, 9 pages including 4 pages of English translation.

* cited by examiner

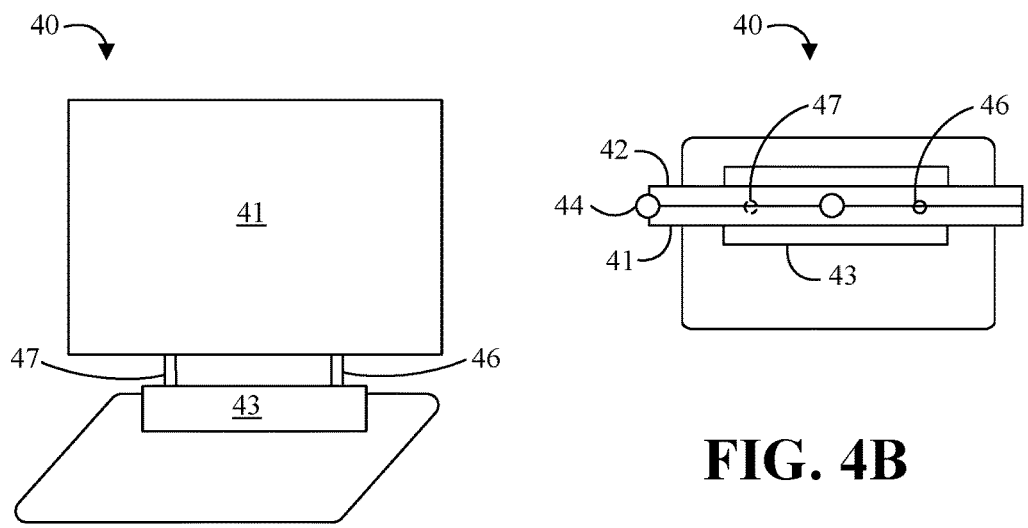
FIG. 4B
FIG. 4A
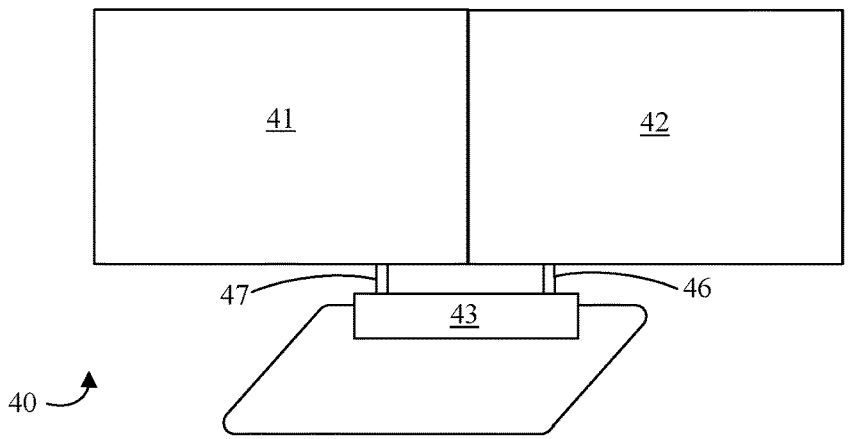
FIG. 4C
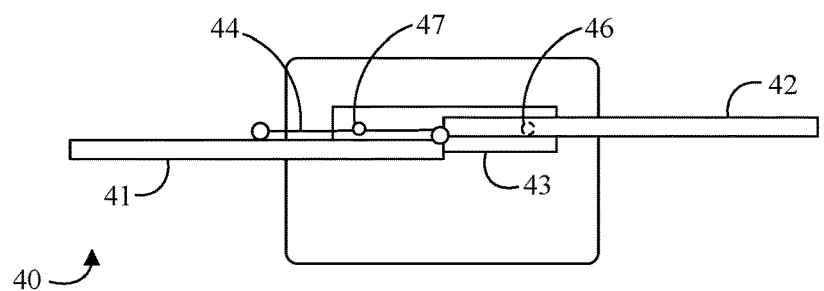
FIG. 4D

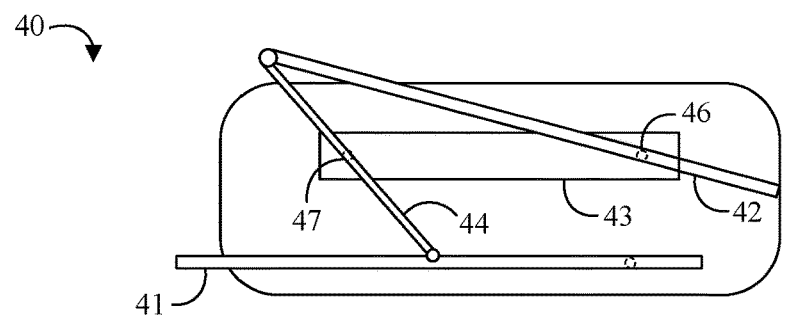
FIG. 4E
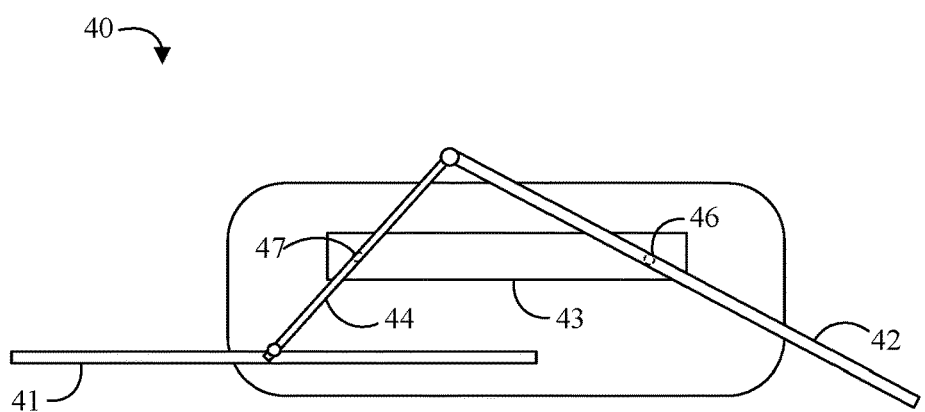
FIG. 4F
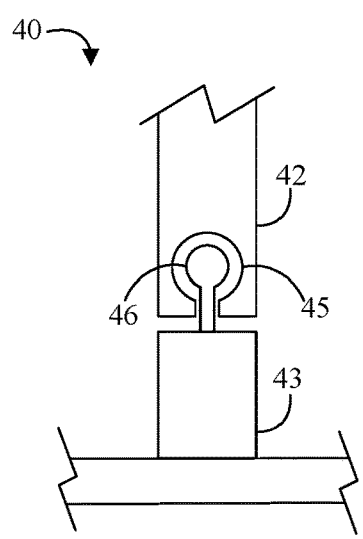 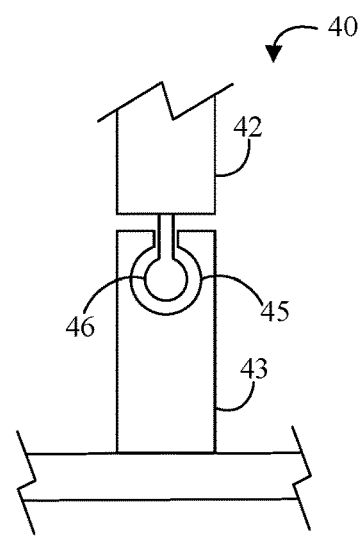
FIG. 4G　　　　FIG. 4H

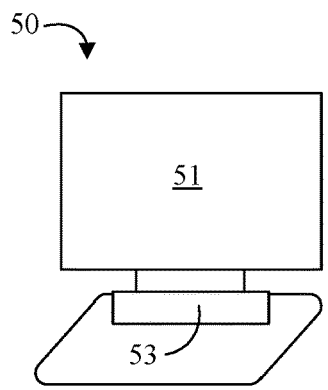
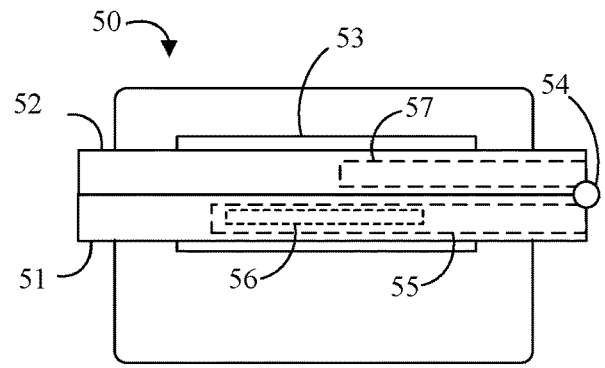
FIG. 5A  FIG. 5B
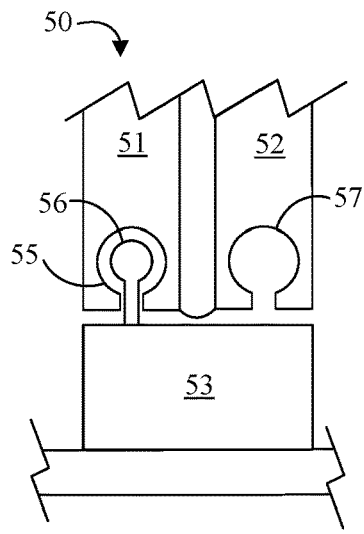
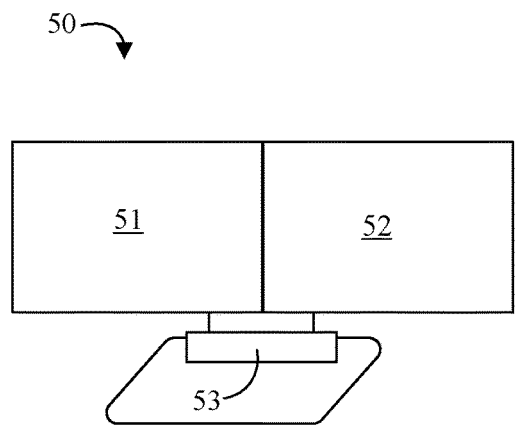
FIG. 5C  FIG. 5D
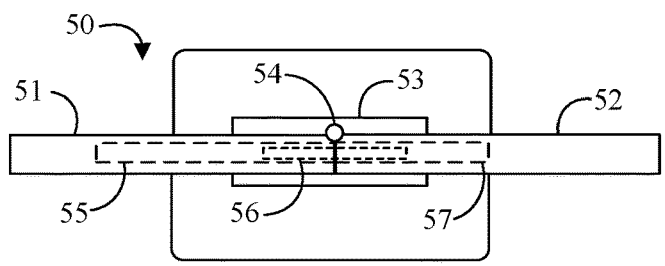
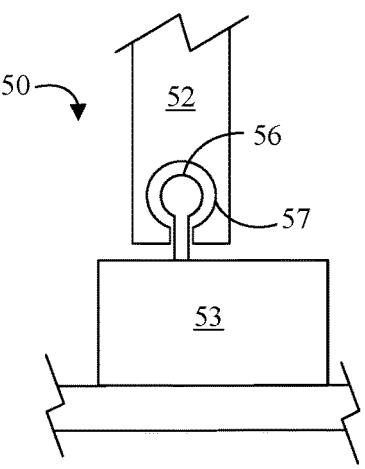
FIG. 5E  FIG. 5F

CONVERTIBLE DUAL SCREEN LAPTOP

CROSS REFERENCE TO RELATED APPLICATIONS

This application is a U.S. National Phase Patent Application which claims benefit to International Patent Application No. PCT/US2016/040792 filed on Jul. 1, 2016.

TECHNICAL FIELD

Embodiments generally relate to convertible displays. More particularly, embodiments relate to processing devices with convertible displays.

BACKGROUND

Dual screen laptops have been introduced to the market. The company GSCREEN introduced a model called the SPACEBOOK where a primary front screen and secondary back screen both slide laterally on fixed horizontal tracks. The company LENOVO introduced a THINKPAD model W700ds where a small secondary screen pops out of a side compartment. In the W700ds, the primary screen is affixed to a conventional clamshell hinge, but otherwise doesn't move or slide.

BRIEF DESCRIPTION OF THE DRAWINGS

The various advantages of the embodiments will become apparent to one skilled in the art by reading the following specification and appended claims, and by referencing the following drawings, in which:

FIG. 4A is a front, partial perspective block diagram view of another dual screen display device according to an embodiment;

FIG. 4B is a top view block diagram of the dual screen display device according to the embodiment of FIG. 4A;

FIG. 4C is another front, partial perspective block diagram view of the dual screen display device according to the embodiment of FIG. 4A;

FIG. 4D is another top view block diagram of the dual screen display device according to the embodiment of FIG. 4C;

FIG. 4E is another top view block diagram of the dual screen display device according to the embodiment of FIG. 4A;

FIG. 4F is another side view block diagram of the dual screen display device according to the embodiment of FIG. 4A;

FIG. 4G is an enlarged side view block diagram of the dual screen display device according to the embodiment of FIG. 4A;

FIG. 4H is an enlarged side view block diagram of another dual screen display device according to the embodiment of FIG. 4A;

FIG. 5A is a front, partial perspective block diagram view of another dual screen display device according to an embodiment;

FIG. 5B is a top view block diagram of the dual screen display device according to the embodiment of FIG. 5A;

FIG. 5C is an enlarged side view block diagram of the dual screen display device according to the embodiment of FIG. 5A;

FIG. 5D is another front, partial perspective block diagram view block of the dual screen display device according to the embodiment of FIG. 5A;

FIG. 5E is another top view block diagram of the dual screen display device according to the embodiment of FIG. 5D;

FIG. 5F is an enlarged side view block diagram of the dual screen display device according to the embodiment of FIG. 5E;

DESCRIPTION OF EMBODIMENTS

Figure 1A:
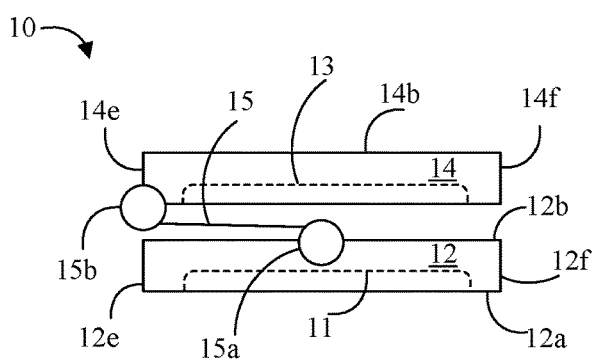
FIG. 1A is a top view block diagram of a dual screen display device according to an embodiment.
Figure 1B:
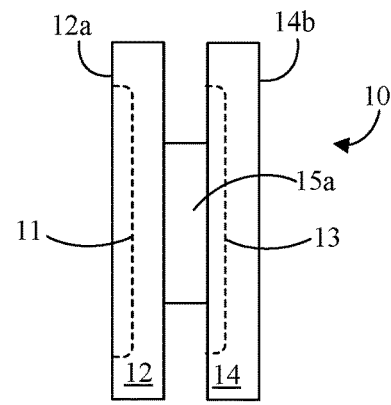
FIG. 1B is a side view block diagram of the dual screen display device according to the embodiment of FIG. 1A.
Figure 1C:
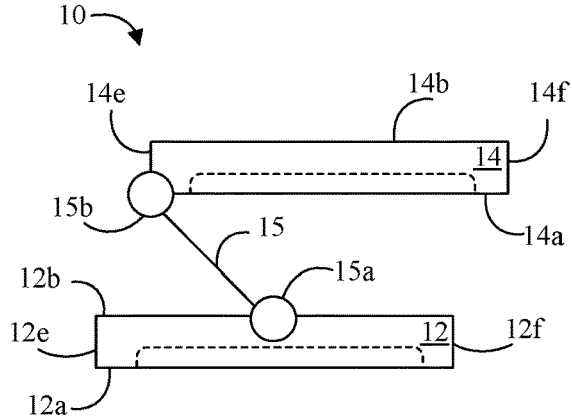
FIG. 1C is another top view block diagram of the dual screen display device according to the embodiment of FIG. 1A.
Figure 1D:
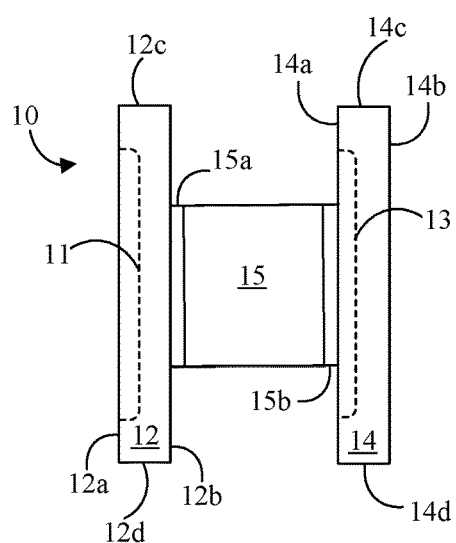
FIG. 1D is another side view block diagram of the dual screen display device according to the embodiment of FIG. 1C.
Figure 1E:
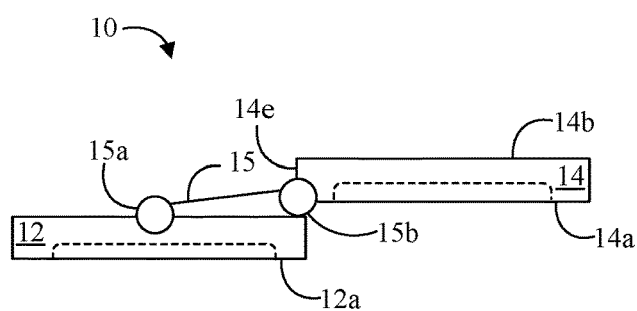
FIG. 1E is another top view block diagram of the dual screen display device according to the embodiment of FIG. 1A.
Figure 1F:
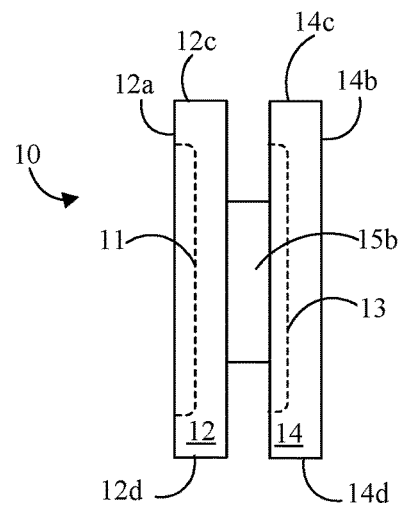
FIG. 1F is another side view block diagram of the dual screen display device according to the embodiment of FIG. 1E.
Figure 2A:
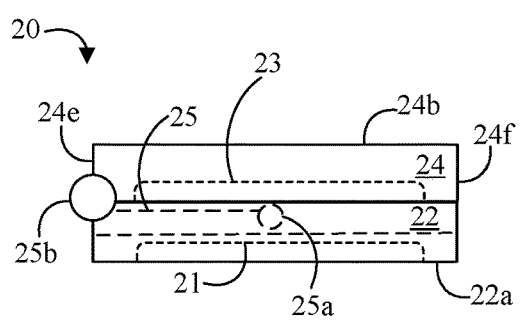
FIG. 2A is a top view block diagram of another dual screen display device according to an embodiment.
Figure 2B:
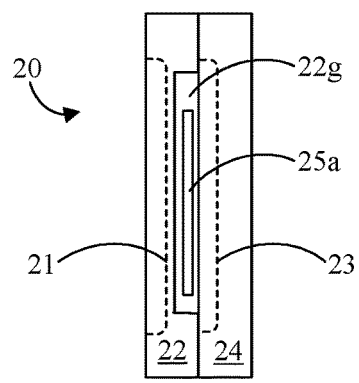
FIG. 2B is a side view block diagram of the dual screen display device according to the embodiment of FIG. 2A.
Figure 2C:
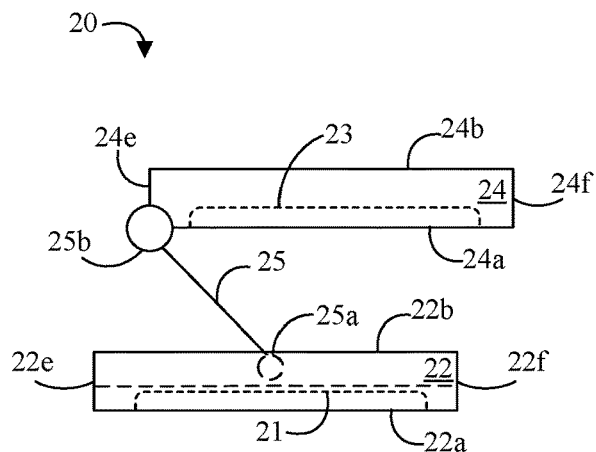
FIG. 2C is another top view block diagram of the dual screen display device according to the embodiment of FIG. 2A.
Figure 2D:
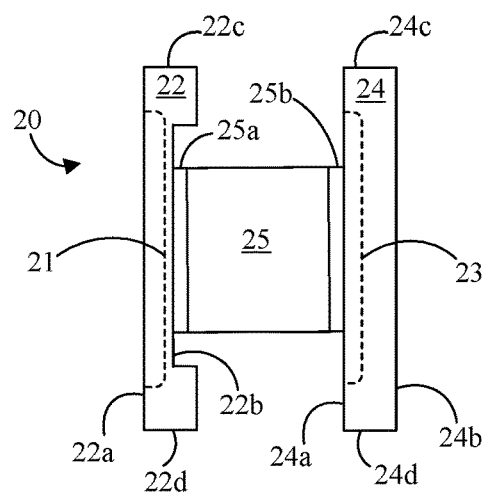
FIG. 2D is another side view block diagram of the dual screen display device according to the embodiment of FIG. 2C.
Figure 2E:
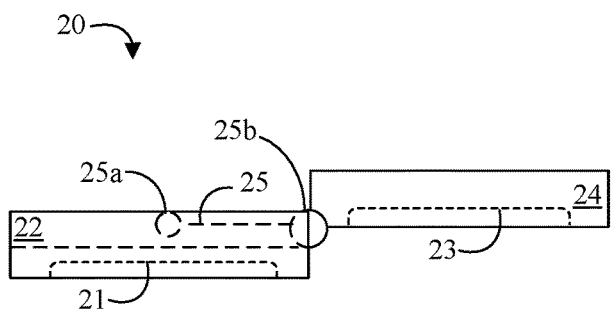
FIG. 2E is another top view block diagram of the dual screen display device according to the embodiment of FIG. 2A.
Figure 2F:
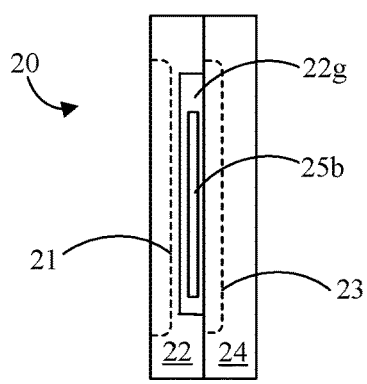
FIG. 2F is another side view block diagram of the dual screen display device according to the embodiment of FIG. 2E.
Figure 3A:
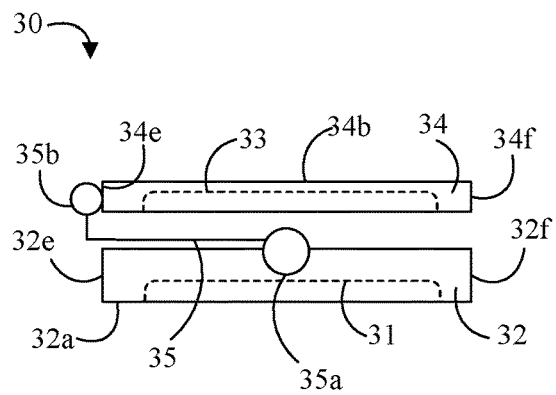
FIG. 3A is a top view block diagram of another dual screen display device according to an embodiment.
Figure 3B:
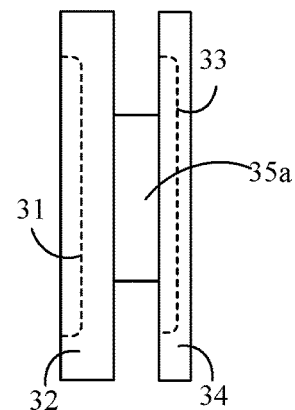
FIG. 3B is a side view block diagram of the dual screen display device according to the embodiment of FIG. 3A.
Figure 3C:
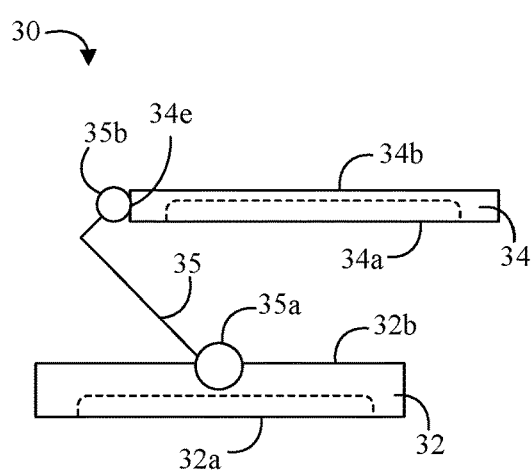
FIG. 3C is another top view block diagram of the dual screen display device according to the embodiment of FIG. 3A.
Figure 3D:
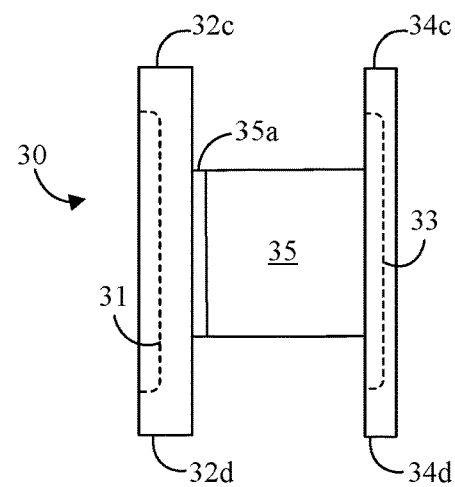
FIG. 3D is another side view block diagram of the dual screen display device according to the embodiment of FIG. 3C.
Figure 3E:
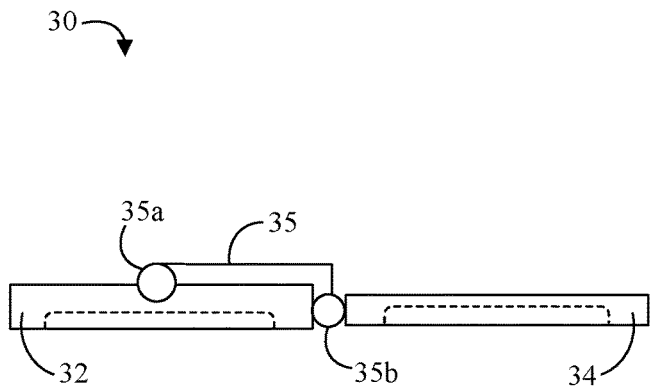
FIG. 3E is another top view block diagram of the dual screen display device according to the embodiment of FIG. 3A.
Figure 3F:
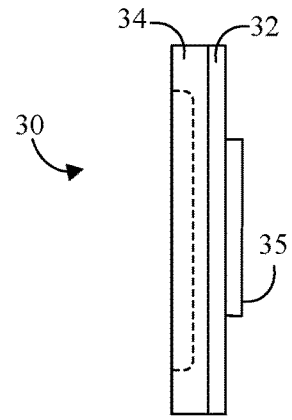
FIG. 3F is another side view block diagram of the dual screen display device according to the embodiment of FIG. 3E.

Turning now to FIGS. 1A to 1F, an embodiment of a dual screen display device 10 may include a first display 11 with a housing 12 having a front 12a, a back 12b, a top 12c, a bottom 12d, a first side 12e, and a second side 12f opposed to the first side 12e. The first display 11 is positioned to visually present content through the front 12a of the first display housing 12. The dual screen display device 10 may further include a second display 13 with a housing 14 having a front 14a, a back 14b, a top 14c, a bottom 14d, a first side 14e, and a second side 14f opposed to the first side 14e. The second display 13 is positioned to visually present content through the front 14a of the second display housing 14. Advantageously, the dual screen display device 10 may further include a pivot plate 15 coupled between the first and second display housings 12 and 14, the pivot plate 15 having front, back, a top, a bottom, a first side 15a, and a second side 15b opposed to the first side 15a. The first side 15a of the pivot plate 15 may be pivotably coupled to the back 12b of the first display housing 12 and the second side 15b of the pivot plate may be pivotably coupled to one of the first and second sides 14e or 14f of the second display housing 14.

For example, in some embodiments of the dual screen display device 10, the first display housing 12 may have a width W1 as measured between the first and second sides 12e and 12f of the first display housing 12. The pivot plate 15 may have a first pivot point A where the first side 15a of the pivot plate 15 is pivotably coupled to the first display housing 12 and a second pivot point B where the second side 15b of the pivot plate 15 is pivotably coupled to the second display housing 14. For example, in some embodiments of the dual screen display device 10, a width W2 between the first and second pivot points A and B is about one half the width W1 of the first display housing 12 (e.g. W2~½ W1), and the first side 15a of the pivot plate 15 may be pivotably coupled to the back 12b of the first display housing 12 about midway between the first and second sides 12e and 12f of the first display housing 12.

Turning now to FIGS. 2A to 2F, an embodiment of a dual screen display device 20 may include a first display 21 with a housing 22 having a front 22a, a back 22b, a top 22c, a bottom 22d, a first side 22e, and a second side 22f opposed to the first side 22e. The first display 21 is positioned to display content through the front 22a of the first display housing 22a. The dual screen display device 20 may further include a second display 23 with a housing 24 having a front 24a, a back 24b, a top 24c, a bottom 24d, a first side 24e, and a second side 24f opposed to the first side 24e. The second display 23 is positioned to display content through the front 24a of the second display housing 24. Advantageously, the dual screen display device 20 may further include a pivot plate 25 coupled between the first and second display housings 22 and 24, the pivot plate 25 having a front, back, a top, a bottom, a first side 25a, and a second side 25b opposed to the first side 25a. The first side 25a of the pivot plate 25 may be pivotably coupled to the back 22b of the first display housing 22 and the second side 25b of the pivot plate 25 may be pivotably coupled to one of the first and second sides 24e or 24f of the second display housing 24. In some embodiments of the dual screen display device 20, the back 22b of the first display housing 22 may include a recessed section 22g sized to receive the pivot plate 25 when the pivot plate 25 is folded proximate to the back 22b of the first display housing 22.

For example, in any of the embodiments described herein, one side of the pivot plate may include a first portion of a piano hinge to pivotably couple to a mating portion of the piano hinge on the back of the first display housing (e.g. with a suitable pin holding the piano hinge together).

Turning now to FIGS. 3A to 3F, an embodiment of a dual screen display device 30 may include a first display 31 with a housing 32 having a front 32a, a back 32b, a top 32c, a bottom 32d, a first side 32e, and a second side 32f opposed to the first side 32e. The first display 31 is positioned to display content through the front 32a of the first display housing 32a. The dual screen display device 30 may further include a second display 33 with a housing 34 having a front 34a, a back 34b, a top 34c, a bottom 34d, a first side 34e, and a second side 34f opposed to the first side 34e. The second display 33 is positioned to display content through the front 34a of the second display housing 34. Advantageously, the dual screen display device 30 may further include a pivot plate 35 coupled between the first and second display housings 32 and 34, the pivot plate 35 having a front, back, a top, a bottom, a first side 35a, and a second side 35b opposed to the first side 35a. The first side 35a of the pivot plate 35 may be pivotably coupled to the back 32b of the first display housing 32 and the second side 35b of the pivot plate may be pivotably coupled to one of the first and second sides 34e or 34f of the second display housing 34. In some embodiments of the dual screen display device 30, the back 32b of the first display housing 32 may include a recessed section sized to receive the pivot plate 35 when the pivot plate 35 is folded proximate to the back 32b of the first display housing 32.

Advantageously, in some embodiments of the dual screen display device 30, the pivot plate 35 may include an offset hinge on the second side 35*b* of the pivot plate 35 to pivotably couple the second side 35*b* of the pivot plate to one of the first and second sides 34*e* or 34*f* of the second display housing 34. For example, an appropriately configured offset hinge may advantageously allow the second display housing 34 to fold completely flush against the first display housing 32 when the front 34*a* of the second display housing 34 is positioned against the back 32*b* of the first display housing 32. For example, an appropriately configured offset hinge 36 may advantageously further allow the second display housing 34 to substantially align the front 34*a* of the second display housing with the front 32*a* of the first display housing 32 when the first and second display housings 32 and 34 are positioned side by side.

Turning now to FIGS. 4A to 4H, an embodiment of a dual screen display device 40 may include a set of displays including a first display 41 and a second display 42. A base 43 may support the displays 41 and 42. A hinge 44 may be coupled between the first and second displays 41 and 42. A channel 45 may be provided in one of the displays 41 or 42 or the base 43. A post 46 may be received in the channel 45 and also coupled to the other of the displays 41 or 42 or the base 43 (e.g. see FIGS. 4G and 4H). Advantageously, the post 46 and channel 45 may provide a sliding translation between the base 43 and the displays 41 and 42. Advantageously, the hinge 44, channel 45 and post 46 may cooperate to provide a coupled translation of the first and second displays 41 and 42 relative to the base 43.

For example, in some embodiments of the dual screen display device 40, the hinge 44 may include a pivot plate and a first side of the pivot plate may be pivotably coupled to a back of the first display 41 and a second side of the pivot plate opposed to the first side of the pivot plate may be pivotably coupled to a side of the second display 42. For example, the first display 41 may have a width W1 as measured between opposed first and second sides of the first display 41. The pivot plate may have a first pivot point A where the first side of the pivot plate is pivotably coupled to the back of the first display 41, a second pivot point B where the second side of the pivot plate is pivotably coupled to the side of the second display, and a width W2 between the first and second pivot points A and B is about one half the width W1 of the first display 41 (e.g. W2~½ W1). For example, the first side of the pivot plate may be pivotably coupled to the back of the first display 41 about midway between the first and second sides of the first display 41.

In some embodiments of the dual screen display device 40, the channel 45 may be provided in the second display 42 and the post 46 may include a pivotable post coupled to the base 43. The pivot plate may further include a pivotable post 47 coupled to the base 43. For example, the pivotable post 47 may be positioned about midway between the first and second pivot points. For example, the pivotable post 47 of the pivot plate may be hollow to provide a routing path for wires between the base 43 and the first display 41. Advantageously, the hinge 44, posts 46 and 47, and channel 45 may cooperate to provide a coupled translation of the first and second displays 41 and 42 relative to the base 43.

For example, moving the first display 41 will impute a corresponding movement to the side of the second display 42 through the coupled hinge 44. The post 46 and channel 45 cooperate to guide a sliding movement of the second display 42. As the first display 41 is pulled forward and then moved to the side, the second display 42 will automatically and naturally move into a side by side position with the first display 41 with the two displays 41 and 42 substantially centered relative to the base 43. The post 46 may be a pin fixed in the base 43 while the channel 45 may be a groove, track, or rail in the second display 42. Alternatively, the post 46 may be a pin fixed in the second display 42 while the channel 45 may be a groove, track, or rail in the base 43.

As described elsewhere herein, in other embodiments of the dual screen display device 40 the back of the first display 41 may include a recessed section sized to receive the pivot plate when the pivot plate is folded proximate to the back of the first display 41. The pivot plate may include a first portion of a piano hinge on the first side of the pivot plate to pivotably couple the first side of the pivot plate to a mating portion of the piano hinge on the back of the first display 41. The pivot plate may include an offset hinge on the second side of the pivot plate to pivotably couple the second side of the pivot plate to the side of the second display 42. For example, the offset hinge may provide a coupled movement between the first and second displays 41 and 42 to a booking arrangement of the displays with the first display 41 positioned to the side of the second display 42 and with each of the first and second displays 41 and 42 at an inward angle.

The dual screen display device 40 may further include an arm pivotably coupled at a first end of the arm to the first display 41 and pivotably coupled at a second end of the arm to the base 43. Advantageously, the arm may cooperate with the pivot plate to constrain the movement of the first display 41 relative to the base 43. For example, a length between pivot points of the arm may be about the same as a length between the pivotable post 47 and the first pivot point of the pivot plate such that the first display 41 remains substantially parallel to its original position as it gets pulled forward and moved to the side.

Advantageously, the second display 42 may have a coupled motion relative to the first display 41. For example, the user may pull the first display 41 in one direction and the second display 42 may move smoothly in other direction. For example, the second display 42 may smoothly fold out in other direction. Advantageously, the user doesn't need to touch or slide the second display screen. In some embodiments of the dual screen display device 40, the movement of the displays 41 and 42 may be motorized.

Turning now to FIGS. 5A to 5F, an embodiment of a dual screen display device 50 may include a set of displays including a first display 51 and a second display 52. A base 53 may support the displays 51 and 52. A hinge 54 may be coupled between the first and second displays 51 and 52. A channel 55 may be provided in one of the displays 51 or 52 or the base 53. A post 56 may be received in the channel 55 and also coupled to the other of the displays 51 or 52 or the base 53. Advantageously, the post 56 and channel 55 may provide a sliding translation between the base 53 and the displays 51 and 52. Advantageously, the hinge 54, channel 55 and post 56 may cooperate to provide a coupled translation of the first and second displays 51 and 52 relative to the base 53.

For example, in some embodiments of the dual screen display device 50, the hinge 54 may couple the first display 51 to the second display 52 along a co-located side of the first and second displays 51 and 52. For example, the hinge 54 may be a 180 degree or greater hinge and the displays 51 and 52 may have display faces that face opposite directions when the hinge 54 is closed and in a same direction when the hinge 54 is opened 180 degrees. For example, the channel 55 may be provided along a bottom edge of the first display 51 and the post 56 may be received in the channel 55. For example, the post 56 may be about half the length of the first display 51 and the channel 55 may include a stop at a point where the dual screen display arrangement is substantially centered at the base 53. Advantageously, the hinge 54 couples the first and second displays 51 and 52 at the center point of the displays such that the two displays are flush and slide together. In some embodiments, the post 56 may extend laterally beyond both sides of the center point of the base 53 and the second display 52 may also have a mating channel 57 to slide along the post 56 (in which case the channel in the second display 52 may also include a stop at the point where the dual screen display arrangement is centered on the base 53.

Advantageously, the second display 52 may have a coupled motion relative to the first display 51. For example, when the second display 52 is rotated to a side-by-side position with the first display 51 the user may either pull on the first display 51 or push on the second display 52 to slide both displays into a centered position.

Turning now to FIGS. 6A to 6I, an electronic processing device 60 may include a first display 61, a second display 62, a chassis 63 (e.g. including a processor and an input device such as a keyboard or a touchpad), a display base 64 to support the first and second displays 61 and 62, and a first hinge 65 coupled to the chassis 63 and the display base 64 to fold the first and second displays 61 and 62 against the chassis 63. For example, the first hinge 65 may be a clamshell hinge or a 360 degree hinge. Advantageously, the electronic processing device 60 further includes a pivot plate 66 pivotably coupled between the first and second displays 61 and 62 and pivotably coupled to the display base 64. A slidable post 67 may be coupled between the second display 62 and the display base 64. Advantageously, the pivot plate 66 may provide a coupled movement between the first and second displays 61 and 62 from a first arrangement of the displays with the first display 61 positioned in front of the second display 62 (e.g. see FIG. 6A) and a second arrangement of the displays with the first display 61 positioned to the side of the second display (e.g. see FIGS. 6C and 6D). Advantageously, the slidable post 67 may guide a translated movement between the second display 62 and the display base 64 from the first arrangement of the displays and the second arrangement of the displays.

For example, a first side of the pivot plate 66 may be pivotably coupled to a back of the first display 61 and a second side of the pivot plate 66 opposed to the first side of the pivot plate 66 may be pivotably coupled to a side of the second display 62. For example, the first display 61 may have a width W1 as measured between opposed first and second sides of the first display 61. The pivot plate 66 may have a first pivot point A where a first side of the pivot plate 66 is pivotably coupled to the back of the first display 61 and a second pivot point B where the second side of the pivot plate 66 is pivotably coupled to the side of the second display 62. For example, a width W2 between the first and second pivot points is about one half the width W1 of the first display 61 (e.g. W2~½ W1). For example, the first side of the pivot plate 66 may be pivotably coupled to the back of the first display 61 about midway between the first and second sides of the first display 61.

In some embodiments of the electronic processing device 60, the back of the first display 61 may include a recessed section sized to receive the pivot plate 66 when the pivot plate 66 is folded proximate to the back of the first display 61. For example, the pivot plate 66 may include a first portion of a piano hinge on the first side of the pivot plate 66 to pivotably couple the first side of the pivot plate 66 to a mating portion of the piano hinge on the back of the first display 61. For example, the pivot plate 66 may include an offset hinge on the second side of the pivot plate 66 to pivotably couple the second side of the pivot plate 66 to the side of the second display 62. For example, the offset hinge may provide a coupled movement between the first and second displays 61 and 62 to a booking arrangement of the displays with the first display 61 positioned to the side of the second display 62 and with each of the first and second displays 61 and 62 at an inward angle (e.g. see FIGS. 6C and 6H).

Figure 6A:
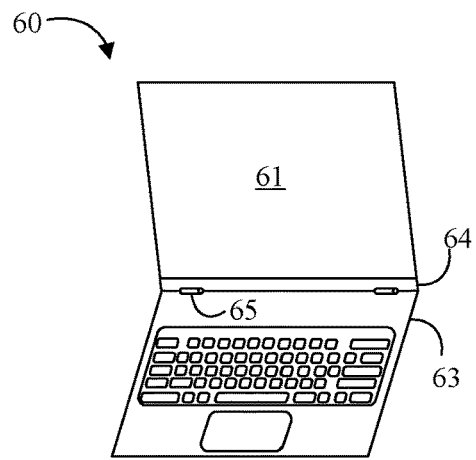
FIG. 6A is a front, perspective block diagram view of an electronic processing device according to an embodiment.
Figure 6B:
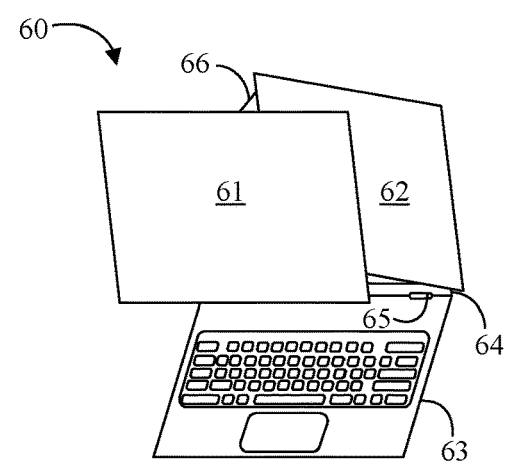
FIG. 6B is another front, perspective block diagram view block of the electronic processing device according to the embodiment of FIG. 6A.
Figure 6C:
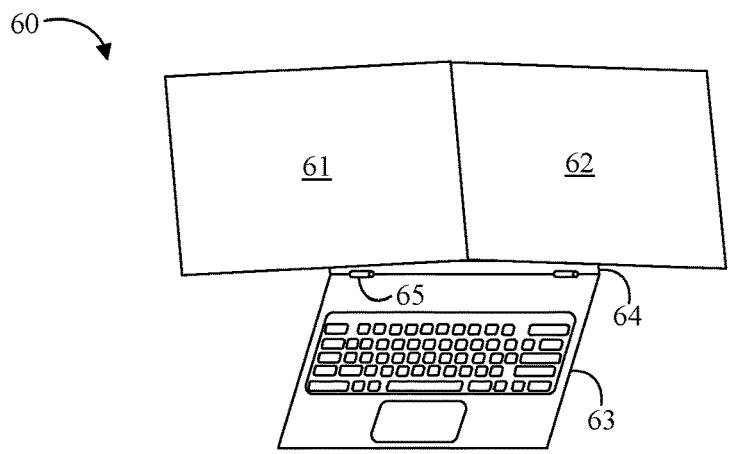
FIG. 6C is another front, perspective block diagram view block of the electronic processing device according to the embodiment of FIG. 6A.
Figure 6D:
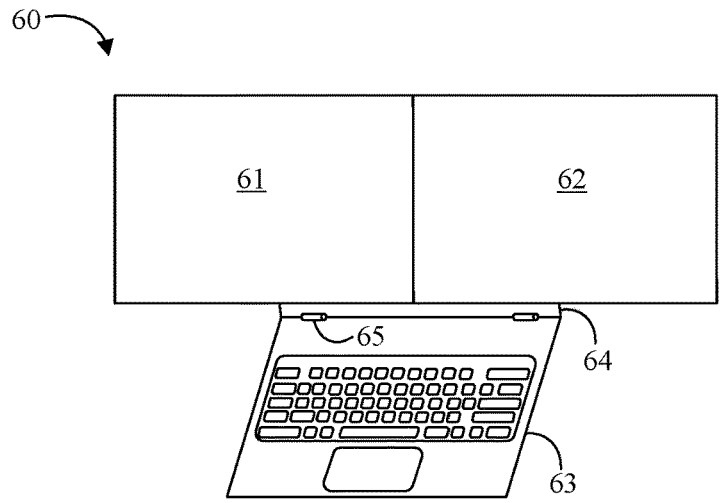
FIG. 6D is another front, perspective block diagram view block of the electronic processing device according to the embodiment of FIG. 6A.
Figure 6E:
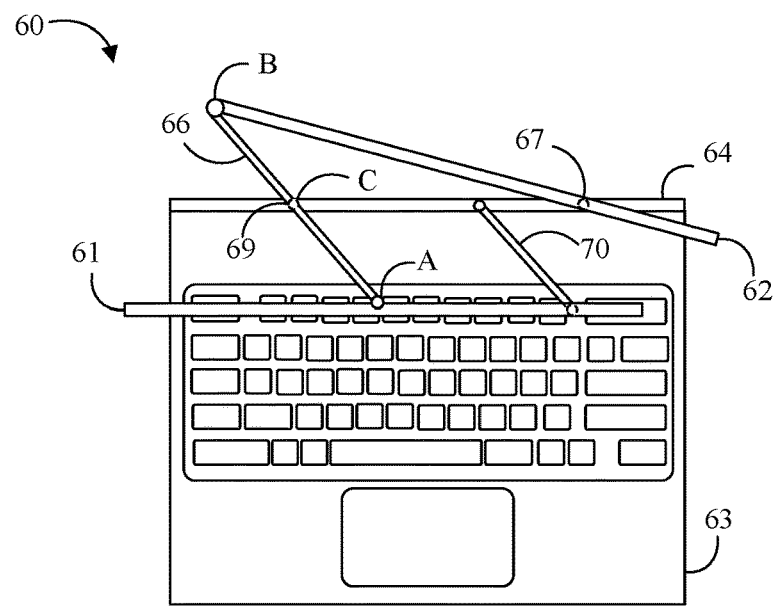
FIG. 6E is a top view block diagram of the electronic processing device according to the embodiment of FIG. 6B.
Figure 6F:
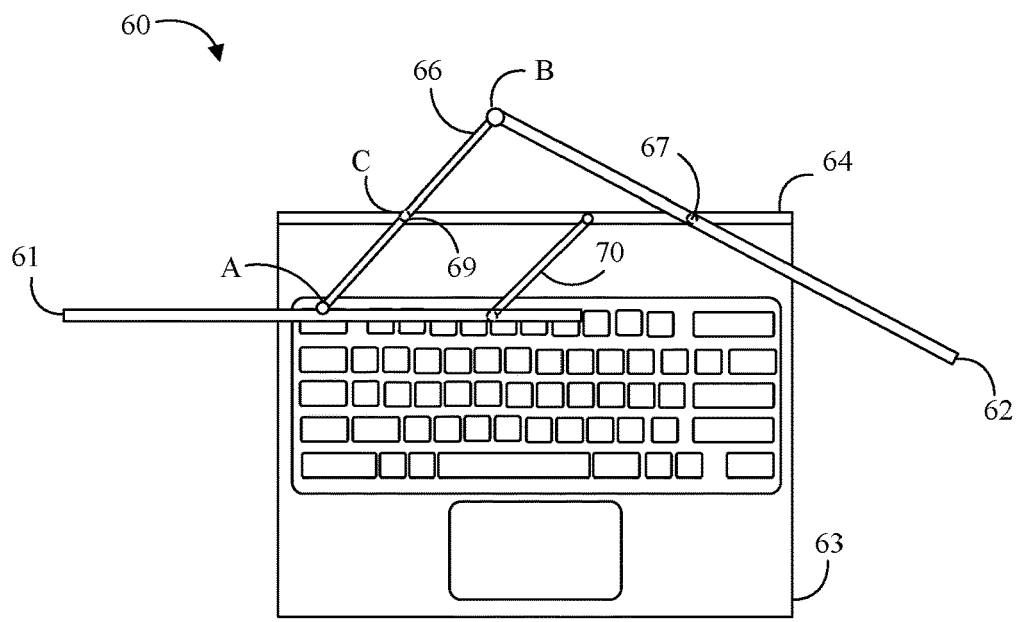
FIG. 6F is another top view block diagram of the electronic processing device according to the embodiment of FIG. 6A.
Figure 6G:
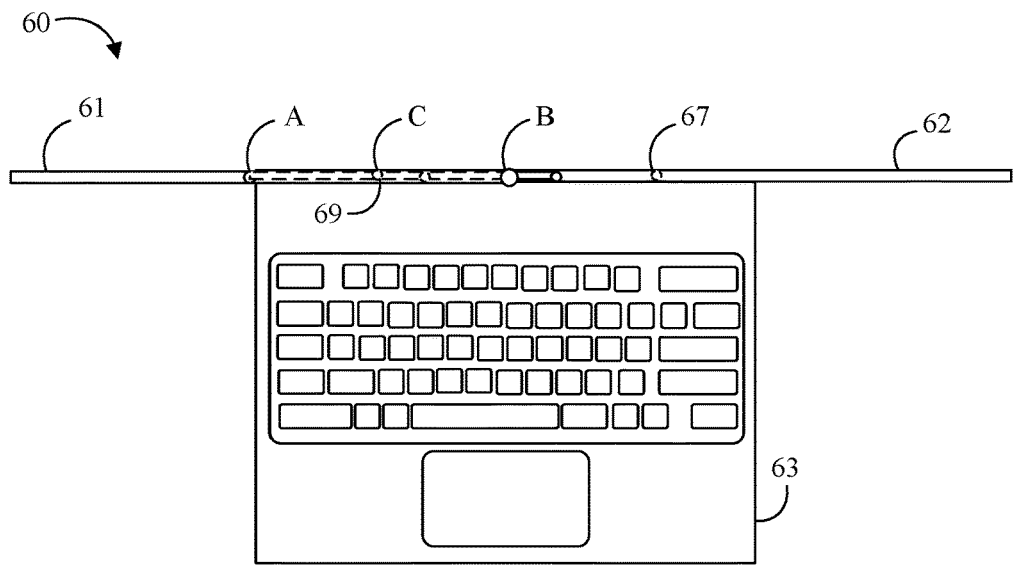
FIG. 6G is another top view block diagram of the electronic processing device according to the embodiment of FIG. 6C.
Figure 6H:
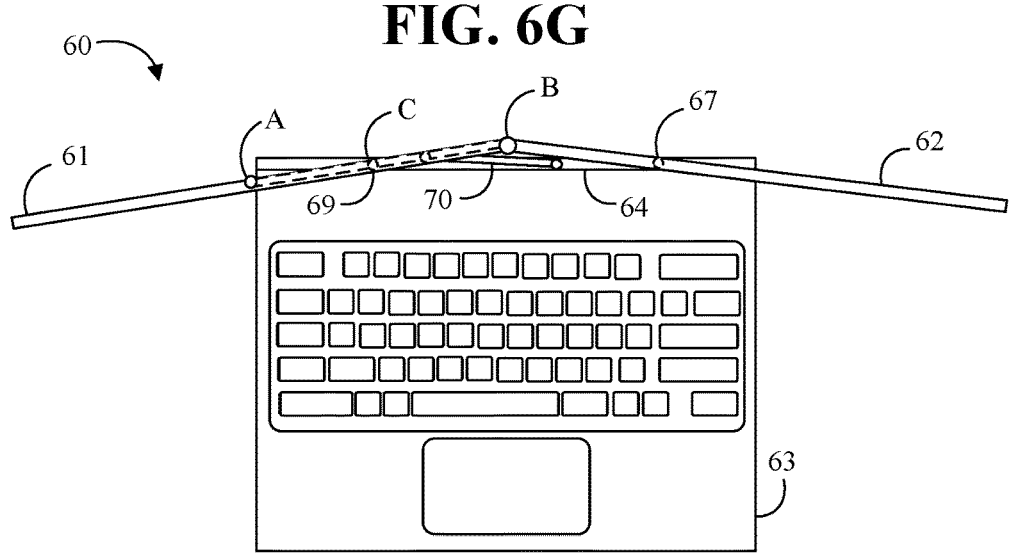
FIG. 6H is another top view block diagram of the electronic processing device according to the embodiment of FIG. 6D.
Figure 6I:
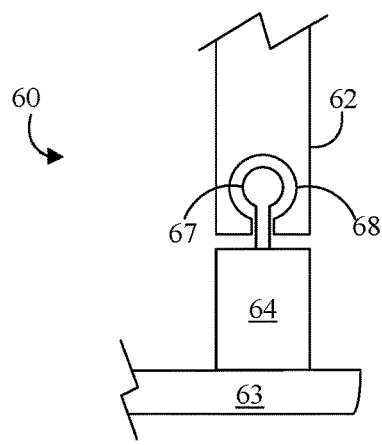
FIG. 6I is an enlarged side view block diagram of the electronic processing display device according to the embodiment of FIG. 6A.

In some embodiments of the electronic processing device 60, the second display 62 may include a channel 68 to receive the slidable post 67 and the slidable post 67 may include a pivotable post coupled to the display base 64 and received within the channel 68 in the second display 62 (e.g. see FIG. 6I). For example, the pivot plate 66 may further include a pivotable post 69 coupled to the display base 64. For example, the pivotable post 69 of the pivot plate 66 may be hollow to provide a routing path for wires between the display base 64 and the first and/or second displays 61 and 62.

In some embodiments, the electronic processing device 60 may further include an arm 70 pivotably coupled at a first end of the arm 70 to the first display 61 and pivotably coupled at a second end of the arm 70 to the display base 64. For example, a length between pivot points of the arm 70 may be about the same as a length between a third pivot point C of the pivot plate 66 at a position of the pivotable post 69 and the first pivot point of the pivot plate. For example, the third pivot point C may be about midway between the first and second pivot points A and B. In some embodiments of the electronic processing device 60, the arm 70 may be relatively short (e.g. about 5 to 6 mm tall) while the pivot plate 66 may be relatively tall (e.g. about 230 mm).

Advantageously, the second display 62 may have a coupled motion relative to the first display 61. For example, the user may pull the first display 61 in one direction and the second display 62 may move smoothly in other direction. For example, the second display 62 may smoothly fold out in other direction. Advantageously, the user doesn't need to touch or slide the back screen. In some embodiments of the electronic processing device 60, the movement of the displays 61 and 62 may be motorized.

Figure 7A:
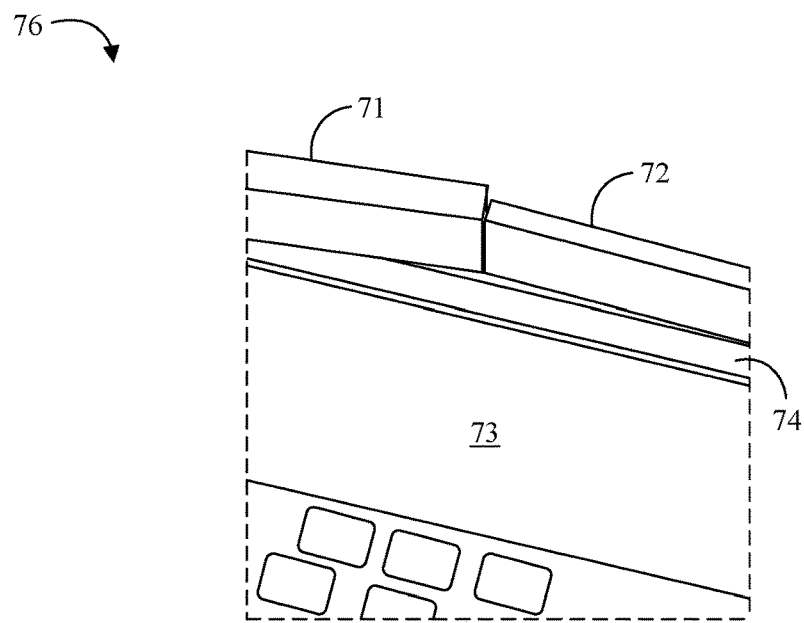
FIG. 7A is a cutaway, partial perspective view of another electronic processing device according to an embodiment.
Figure 7B:
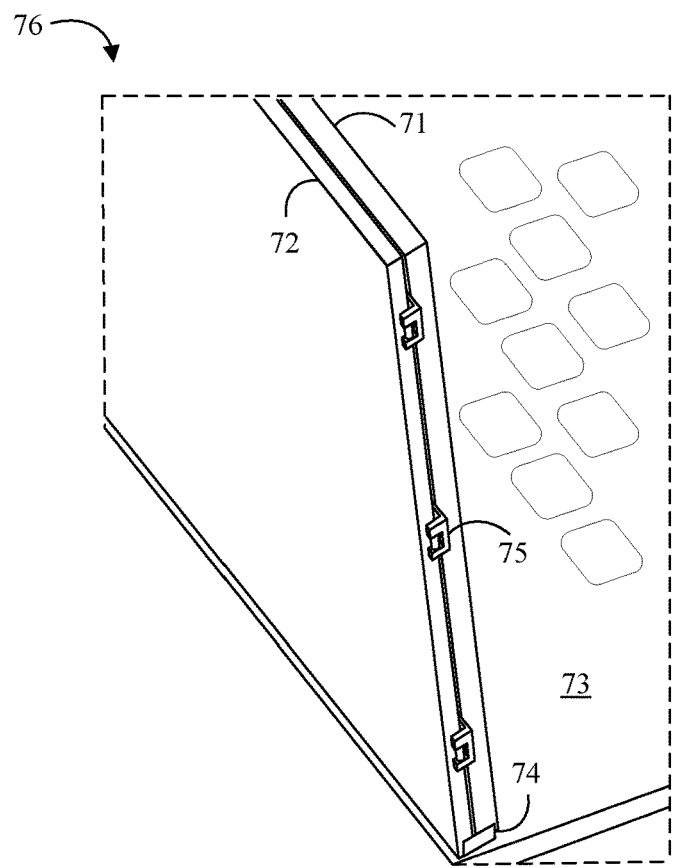
FIG. 7B is a cutaway, partial side perspective view of the electronic processing device according to the embodiment 7A.

Turning now to FIGS. 7A and 7B, embodiments of another electronic processing device 76 may include a first display 71 which is relatively thicker as compared to a second display 72. For example, the electronic processing device may include a chassis 73 pivotably coupled (e.g. by a clamshell or 360 degree hinge) to a display base 74. The device 76 may include various combinations of linkages, pivots, and channels as described herein to couple the relative movement of the first and second displays 71 and 72.

For example, the body of the first display 71 may be relatively thicker to include a back channel to accommodate the size of a pivot plate coupled between the first and second display 72. Advantageously, the pivot plate may include an offset hinge 75 on the side of the pivot plate coupled to the thinner display 72. For example, the offset hinge 75 may push the face of the second display 72 further forward in the dual screen arrangement so that the second display may appear substantially flush with the first display 71.

For example, a booking arrangement of the displays may include the first display 71 positioned to the side of the second display 72 with each of the first and second displays 71 and 72 at an inward angle (e.g. as shown in FIGS. 6C, 6H, and 7A). For example, the user may be able to push the first display 71 beyond parallel (e.g. past flat) counter clockwise relative to base 74 while the second display 72 moves clockwise relative to the base 74. The linkage structures may limit how far past flat the displays can be pushed. Alternatively, suitable stop structures may be provided to limit how far past flat the displays can be pushed.

For example, the offset hinge 75 may advantageously further support flush display faces in the booking arrangement of the first and second displays 71 and 72. For example, as shown in FIG. 7A, the fronts of the two displays 71 and 72 are flush edge to edge due to an offset axis of the offset hinge 75 on the pivot plate coupled to the second display 72. Advantageously, in some environments and situations, the booking arrangement may be considered to provide a more immersive user experience.

Figure 8A:
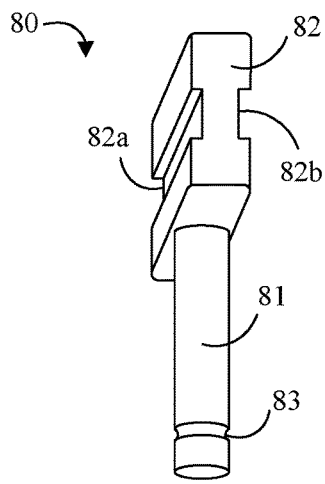
FIG. 8A is a perspective view of a slidable pivot post according to an embodiment.
Figure 8B:
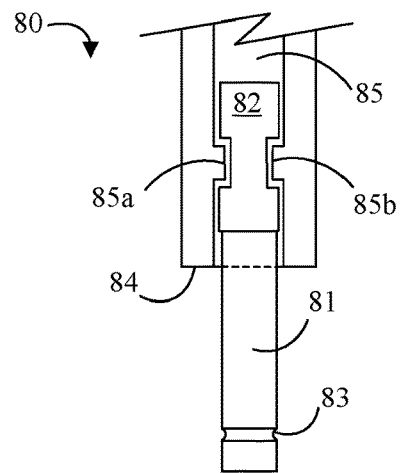
FIG. 8B is a side view of the slidable pivot post received in a display channel according to the embodiment of FIG. 8A.
Figure 9A:
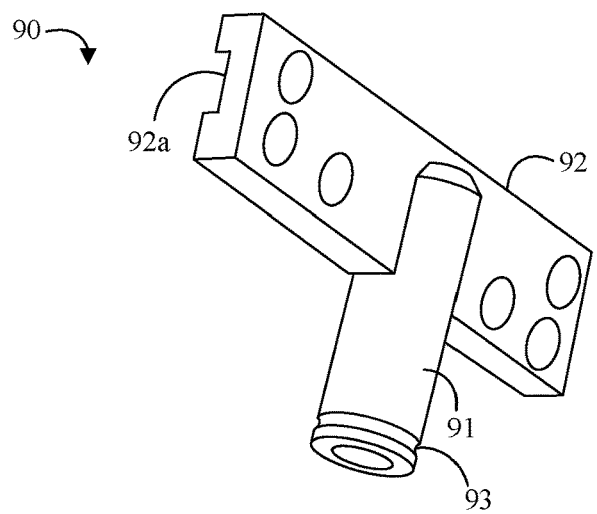
FIG. 9A is a perspective view of a hollow pivot post according to an embodiment.
Figure 9B:
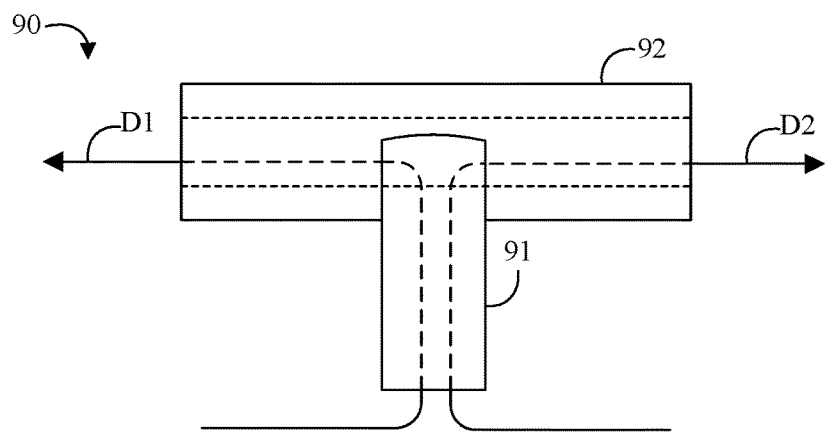
FIG. 9B is a back view of the hollow pivot post according to the embodiment of FIG. 9A with illustrative cable routing paths.

Turning now to FIGS. 8A and 8B, embodiments of a slidable pivot post 80 may include a post 81 coupled to a grooved pin 82. The grooved pin 82 includes a pair of opposed recessed sections 82a and 82b. An end of the post 81 may include a detent 83 (e.g. to snap into a mating structure in the display base). For example, a display housing 84 may include a channel 85 at the bottom of the housing 84 with a pair of opposed rails 85a and 85b. The grooved pin 82 may fit within the channel 85 and slide along the rails 85a and 85b. Advantageously, the slidable pivot post 80 can slide along the rails 85a and 85b of the channel 85 while also rotating in the display base. Turning now to FIGS. 9A and 9B, a mid pivot post 90 may include a hollow cylinder 91 coupled to a fastener plate 92. The fastener plate may include a recessed section 92a. The fastener plate may be affixed to the pivot plate. The hollow cylinder 91 may include a detent 93 at one end to snap into the display base. Advantageously, wires or cables can be routed through the hollow cylinder 91 and the recessed section 92a of the fastener plate 92 to provide suitable electrical connections between the first and second displays and the display base. For example, in some embodiments, wires or cables may be further routed through the clamshell hinges or 360 degree hinges to provide suitable electrical connections between the displays and the device chassis. For example, the miv pivot post 90 may provide a first routing path D1 for connections to the first display and a second routing path D2 for connections to the second display.

Figure 10A:
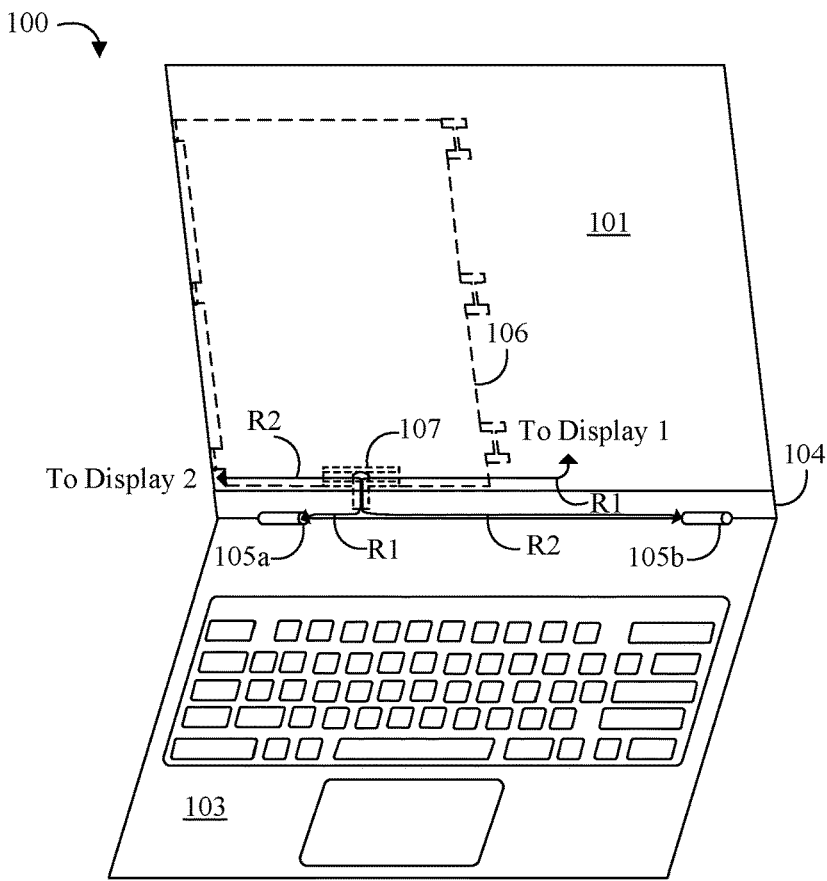
FIG. 10A is a front, perspective block diagram view of another electronic processing system according to an embodiment, with illustrative cable routing paths.
Figure 10B:
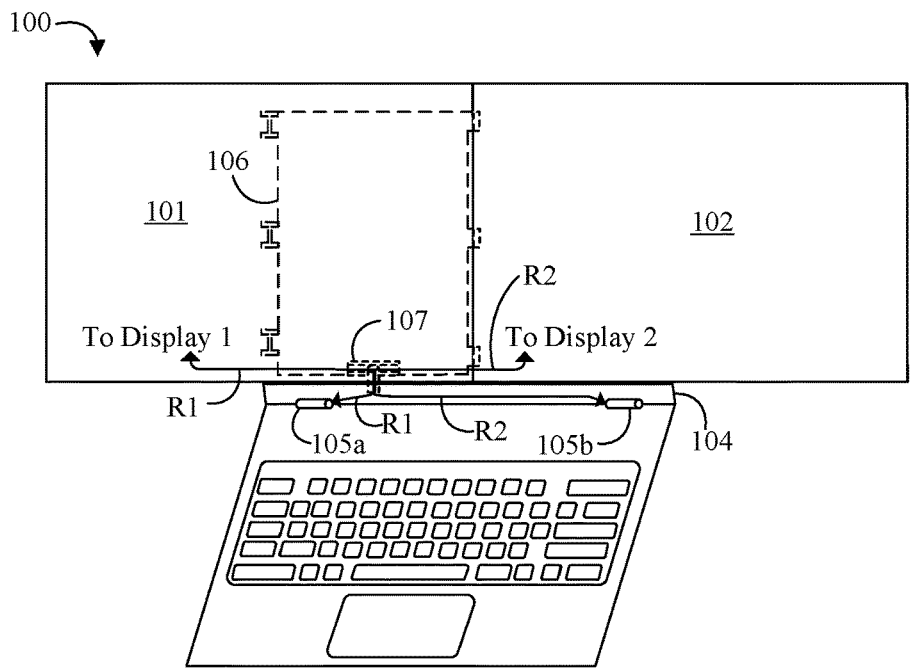
FIG. 10B is another front, perspective block diagram view the electronic processing system according to the embodiment of FIG. 9A, with illustrative cable routing paths.
Figure 10C:
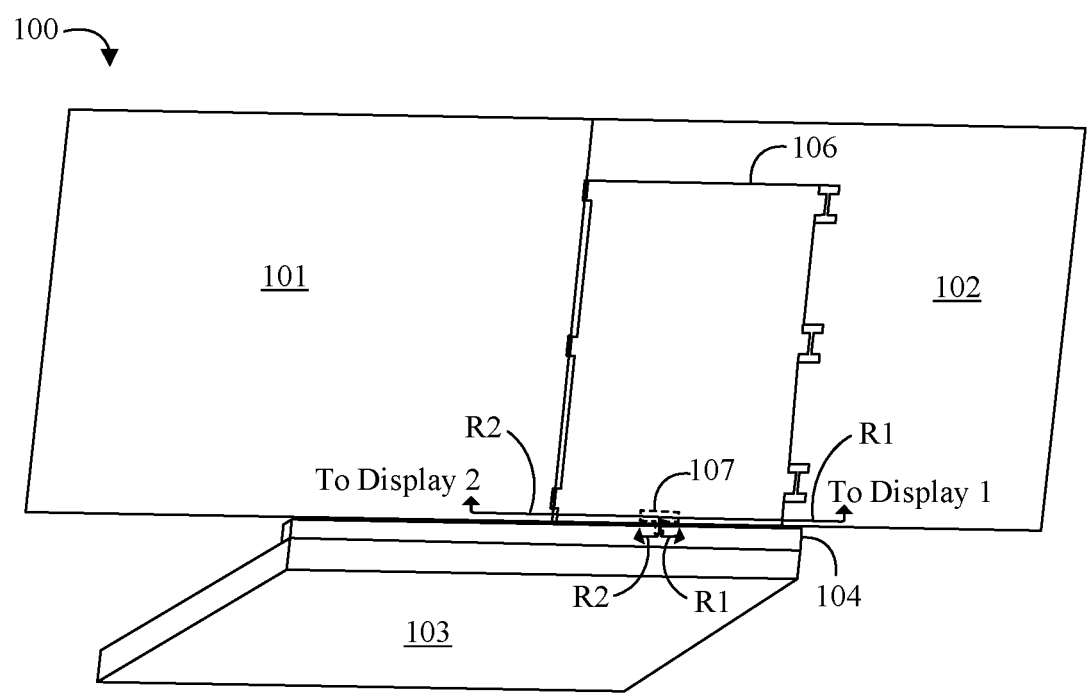
FIG. 10C is a back, perspective block diagram view the electronic processing system according to the embodiment of FIG. 9A, with illustrative cable routing paths.

Turning now to FIGS. 10A to 10C, a convertible dual screen workstation 100 may include a first display 101, a second display 102, a chassis 103 (e.g. including a processor and an input device such as a keyboard or a touchpad), a display base 104 to support the first and second displays 101 and 102, and a first set of hinges 105a and 105b coupled to the chassis 103 and the display base 104 to fold the first and second displays 101 and 102 against the chassis 103. For example, the hinges 105a and 105b may be clamshell hinges or 360 degree hinges. Advantageously, the workstation 100 further includes a mid pivot link 106 pivotably coupled between the first and second displays 101 and 102 and pivotably coupled to the display base 104 with a mid pivot post 107. Advantageously, the mid pivot link 106 may provide a coupled movement between the first and second displays 101 and 102 from a first arrangement of the displays with the first display 101 positioned in front of the second display 102 (e.g. see FIG. 10A) and a second arrangement of the displays with the first display 101 positioned to the side of the second display (e.g. see FIGS. 10B and 10C). The mid pivot link 106 may include simple free rotating hinges that allows for plus and minus 180 degree rotation of the mid pivot link 106. In some embodiments, the mid pivot link 106 may be attached to the left edge of the second display 102 and the middle of the back of the first display 101 using free rotating piano style hinges. The mid pivot link 106 also provides a means to route cables.

For example, the mid pivot post 107 may be affixed to the bottom of the mid pivot link 106 and may be hollow to provide a routing path for wires between the display base 104 and the first and/or second displays 101 and 102. For example, after passing through the mid pivot post 107, wires may be routed along the mid pivot link 106 and into the first and/or second displays 101 and 102 at locations proximate to the hinge areas coupled between the sides of the mid pivot link 106 and the first and/or second displays 101 and 102. For example, in the workstation 100 a first routing path R1 may be provided from the chassis 103 through the hinge 105a and the mid pivot post 107 to the first display 101. A second routing path R2 may be provided from the chassis 103 through the hinge 105b and the mid pivot post 107 to the second display 102.

The workstation 100 may further include a slidable pivot post (e.g. like the slidable pivot post 80 from FIG. 8A) coupled between the display base 104 and a channel in the second display 102. Advantageously, the slidable pivot post may guide a translated movement between the second display 102 and the display base 104 from the first arrangement of the displays and the second arrangement of the displays. In some embodiments, the workstation 100 may further include an arm pivotably coupled at a first end of the arm to the first display 101 and pivotably coupled at a second end of the arm to the display base 104. For example, a length between pivot points of the arm may be about the same as a length between an axis of the mid pivot post the side of the mid pivot link 106 coupled to the back of the first display 101.

Advantageously, the second display 102 may have a coupled motion relative to the first display 101. For example, the user may pull the first display 101 in one direction and the second display 102 may move smoothly in other direction. For example, the second display 102 may smoothly fold out in other direction. Advantageously, the user doesn't need to touch or slide the second display. In some embodiments of the workstation 100, the movement of the displays 101 and 102 may be motorized.

Advantageously, embodiments (e.g. devices 60, 76, 100, etc.) may provide an easy to deploy linkage for converting between a single and a dual screen laptop. For example, embodiments may be used for dual screen laptop workstations using LCD, LED, and/or OLED technology, including flexible OLED display technology. Advantageously, embodiments may utilize a hinge, a linkage, a pivot, and a channel that allows the user to deploy the second screen in a simple intuitive single motion. Advantageously, the deployment of the second screen may provide a visually appealing wow factor during the transformation from a single screen configuration to a dual screen configuration. For example, embodiments of the overall linkage may couple the motion of both displays so that only a single intuitive motion is required to transform from single screen mode to dual screen mode.

Some embodiments may provide the user with an ergonomic high-productivity dual-screen clamshell workstation. Some embodiments may provide a notebook user with either a single screen standard clamshell mode or an expanded immersive dual screen mode. Embodiments may make use of one or more linkages, pivots, and slide structures that allow for a simple intuitive motion for transforming between a single and dual screen. For example, the relative motion between the first and second screen may be coupled through the cooperating structures. Alternatively, embodiments may utilize a 360 degree hinge instead of a clamshell hinge to provide a 4-in-1 conversion to either a single screen tablet or dual screen tablet configuration (in addition to the single screen or dual screen notebook). Advantageously, embodiments of a combination slide and pivot mechanism allows the second display to slide into place from behind the first display.

ADDITIONAL NOTES AND EXAMPLES

Example 1 may include a portable processing system, comprising a first display panel having a first display surface, a first edge of the first display panel along a first side of the first display surface, and a second edge of the first display panel orthogonal to the first edge along a second side of the first display panel. Example 1 further includes a second display panel having a second display surface and a first edge of the second display panel along a first side of the second display surface, the first edge of second display panel mechanically and electrically coupled to the first edge of the first display panel by a first 360 degree hinge such that the first and second display panels can be positioned in at least a first arrangement with the first and second display surfaces facing substantially opposite directions and a second arrangement with the first and second display surfaces facing a substantially same direction. Example 1 further includes a base unit including a processor, a keyboard, and a battery, the base unit mechanically and electrically coupled to the second edge of the first display panel by a second hinge, wherein the second hinge provides a tablet display arrangement with the first arrangement of the display panels rotated substantially flat against the base unit and wherein the second hinge provides a dual screen arrangement with second arrangement of the display panels rotated away from the base unit.

For example, the first display panel includes a sliding mechanism for sliding the first display relative to the base unit. For example, the sliding mechanism comprises a channel formed in the first display panel adapted to receive the second hinge. For example, the second hinge is no more than half the length of the base unit along the coupled edge and wherein the channel defines a stop at a point where the second arrangement is substantially centered at the base unit.

Example 2 may include a processing system including a base unit having a processor. Example 2 further includes a dual screen display unit having a first display panel, a second display panel, and a first coupling mechanism to movably couple the first display panel to the second display panel along co-located edges of the first and second display panels. Example 2 further includes a second coupling mechanism to movably couple the dual screen display unit to the base unit.

For example, the dual screen display unit provides a first display arrangement with the first and second display panels rotated to face opposite directions and the dual screen display unit provides a second display arrangement with the first and second display panels side by side and rotated forward to face a same direction. For example, the second coupling mechanism includes a sliding mechanism for sliding the dual screen display unit relative to the base unit. For example, the sliding mechanism comprises a channel formed in the first display panel adapted to receive a post and wherein the base unit includes the post received in the channel. For example, the post is part of a hinge that is no more than half the length of the base unit and wherein the channel defines a stop at a point where the second display arrangement is substantially centered at the base unit.

Example 3 may include a method of providing multiple display arrangements for a processing device. Example 3 includes providing a first display having a first edge along a first side of the first display and a second edge of the first display orthogonal to the first edge along a second side of the first display, providing a second display having a first edge along a first side of the second display rotatably coupled to the first edge of the first display through substantially 360 degrees of rotation, providing a base unit having a first edge along a first side of the base unit rotatably coupled to the second edge of the first display, providing a tablet display arrangement with the first and second displays rotated along their respective first edges to face opposite to each other and the first display rotated along the second edge substantially flat against the base unit, providing a standard display arrangement with the first and second displays rotated along their respective first edges to face opposite to each other and the first display rotated along the second edge to an open position relative to the base unit, and providing a dual screen arrangement with the first display rotated along the second edge to an open position relative to the base unit and the first and second displays rotated along their respective first edges to an open position with respect to each other.

For example, providing the dual screen arrangement comprises rotating the second display to a substantially flat position relative to the first display with both the first and second displays facing a same direction. For examples, providing the dual screen arrangement further comprises sliding the first and second displays along the first edge of the base unit to a position where the first edge of the first display unit is substantially centered on the first edge of the base unit.

Example 4 utilizes detachable displays devices. For example, the display base may include a connector for mechanical and electrical coupling to the detachable displays.

Example 5 utilizes detachable smart wireless displays or tablets. For example, the display base may include a mechanical holder for the wireless display. No signal routing may be needed for the wireless display. If charging is desired, only power routing may be needed.

The terms "first", "second", "front", "back", "top", "bottom", "side" etc. may be used herein only to facilitate discussion, and carry no particular orientation, temporal, or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An electronic processing device, comprising:
a first display;
a second display;
a chassis including a processor and an input device;
a display base to support the first and second displays;
a first hinge coupled the chassis and the display base to fold the first and second displays against the chassis;
a pivot plate located between the first and second displays, wherein the pivot plate is pivotably coupled to the first display at a first pivot point and to the second display at a second pivot point, the pivot plate comprising a pivotable post positioned between the first and second pivot points, wherein the pivot plate is pivotably coupled to the display base via the pivotable post; and a slidable post coupled between the second display and the display base, wherein the pivot plate is to provide a coupled movement between the first and second displays from a first arrangement of the first and second displays to a second arrangement of the first and second displays, wherein the first arrangement of the first and second displays has the first display positioned in front of the second display and the first and second displays are facing to a user, and wherein the second arrangement of the first and second displays has the first display positioned alongside the second display and facing to the user, and wherein the slidable post is to slide along the second display and guide a translated movement between the second display and the display base from the first arrangement of the first and second displays to the second arrangement of the first and second displays.

2. The electronic processing device of claim 1, wherein a first side of the pivot plate is pivotably coupled to a back of the first display and wherein a second side of the pivot plate opposed to the first side of the pivot plate is pivotably coupled to a side of the second display.

3. The electronic processing device of claim 2, wherein the first display has a width as measured between opposed first and second sides of the first display, wherein the pivot plate has a first pivot point where a first side of the pivot plate is pivotably coupled to the back of the first display, a second pivot point where the second side of the pivot plate is pivotably coupled to the side of the second display, and wherein a width between the first and second pivot points is about one half the width of the first display, and wherein the first side of the pivot plate is pivotably coupled to the back of the first display about midway between the first and second sides of the first display.

4. The electronic processing device of claim 3, wherein the back of the first display includes a recessed section sized to receive the pivot plate when the pivot plate is folded proximate to the back of the first display.

5. The electronic processing device of claim 2, wherein the pivot plate comprises a first portion of a piano hinge on the first side of the pivot plate to pivotably couple the first side of the pivot plate to a mating portion of the piano hinge on the back of the first display.

6. The electronic processing device of claim 2, wherein the pivot plate comprises an offset hinge on the second side of the pivot plate to pivotably couple the second side of the pivot plate to the side of the second display.

7. The electronic processing device of claim 6, wherein the offset hinge is to provide a coupled movement between the first and second displays to a booking arrangement of the first and second displays with the first display positioned to the side of the second display and with each of the first and second displays at an inward angle.

8. The electronic processing device of claim 3, wherein the second display comprises a channel to receive the slidable post and wherein the slidable post comprises a second pivotable post coupled to the display base and received within the channel in the second display.

* * * * *